US012638060B2

(12) United States Patent
Probst et al.

(10) Patent No.: US 12,638,060 B2
(45) Date of Patent: May 26, 2026

(54) GAS PRESSURE SPRING WITH TEMPERATURE COMPENSATION, AND METHOD FOR PRODUCING THE GAS PRESSURE SPRING

(71) Applicant: STABILUS GMBH, Koblenz (DE)

(72) Inventors: Ulrich Probst, Hillscheid (DE); Felix Beib, Koblenz (DE); Alexander Reiser, Münstermaifeld (DE); Nico Unkelbach, Rüscheid (DE); Andreas Seus-Kapellen, Boppard-Udenhausen (DE); Christoph Lischetzki, Andernach (DE); Michael Schneider, Ochtendung (DE)

(73) Assignee: STABILUS GMBH, Koblenz (DE)

( * ) Notice: Subject to any disclaimer, the term of this patent is extended or adjusted under 35 U.S.C. 154(b) by 372 days.

(21) Appl. No.: 18/577,864

(22) PCT Filed: Jul. 14, 2022

(86) PCT No.: PCT/EP2022/069788
§ 371 (c)(1),
(2) Date: Jan. 9, 2024

(87) PCT Pub. No.: WO2023/285615
PCT Pub. Date: Jan. 19, 2023

(65) Prior Publication Data
US 2024/0318702 A1     Sep. 26, 2024

(30) Foreign Application Priority Data

Jul. 16, 2021   (DE) ..................... 10 2021 118 492.4
Sep. 27, 2021   (DE) ..................... 10 2021 124 843.4

(51) Int. Cl.
*F16F 9/43* (2006.01)
*F16F 9/02* (2006.01)
*F16F 9/32* (2006.01)

(52) U.S. Cl.
CPC .......... *F16F 9/3235* (2013.01); *F16F 9/0209* (2013.01)

(58) Field of Classification Search
CPC ............................. F16F 9/3235; F16F 9/0209
See application file for complete search history.

(56) References Cited

U.S. PATENT DOCUMENTS

| | | | | |
|---|---|---|---|---|
| 2016/0298711 A1* | 10/2016 | Colombo | .............. | F16F 9/0218 |
| 2018/0087595 A1* | 3/2018 | Cotter | ..................... | F16F 9/432 |
| 2022/0333663 A1* | 10/2022 | Rölleke | ................. | F16F 9/3242 |

FOREIGN PATENT DOCUMENTS

| | | |
|---|---|---|
| CN | 208331091 U | 1/2019 |
| DE | 3141295 A1 | 4/1983 |

(Continued)

OTHER PUBLICATIONS

International Search Report for PCT/EP2022/069788 mailed on Oct. 24, 2022.

*Primary Examiner* — Amy J. Sterling
(74) *Attorney, Agent, or Firm* — Schmeiser, Olsen & Watts, LLP

(57) ABSTRACT

A gas pressure spring is provided, including a working piston which is guided displaceably in a working cylinder along a stroke axis, a compensating cylinder encloses the working cylinder, and a compensating piston which is of hollow-cylindrical shape and is guided displaceably in the compensating cylinder along the stroke axis. The working cylinder has an open end, at which the compensating cylinder forms a projection beyond the working cylinder with a closed end. The compensating piston separates a working chamber, which is arranged in the working cylinder, a (Continued)

compensating chamber, which is arranged between the working cylinder and the compensating cylinder, and a restoring chamber, which is arranged in the projection from one another. A distance, radially with respect to the stroke axis, of the compensating cylinder from the working cylinder is greater in the stroke range than in an end region of the working cylinder.

16 Claims, 2 Drawing Sheets

(56)                    References Cited

FOREIGN PATENT DOCUMENTS

| | | | |
|---|---|---|---|
| DE | 10313440 | A1 | 10/2004 |
| DE | 102008045903 | A1 | 3/2010 |
| DE | 102020113749 | A1 | 11/2021 |
| EP | 1795777 | A2 | 6/2007 |

* cited by examiner

GAS PRESSURE SPRING WITH TEMPERATURE COMPENSATION, AND METHOD FOR PRODUCING THE GAS PRESSURE SPRING

CROSS-REFERENCE TO RELATED APPLICATIONS

This application claims priority to PCT Application No. PCT/EP2022/069788, having a filing date of Jul. 14, 2022, based on DE 10 2021 124 843.4, having a filing date of Sep. 27, 2021, and DE 10 2021 118 492.4, having a filing date of Jul. 16, 2021, the entire contents all of which are hereby incorporated by reference.

FIELD OF TECHNOLOGY

The following relates to a gas pressure spring according to the preamble of claim 1 and a method for producing the gas pressure spring.

BACKGROUND

Gas pressure springs are known from the conventional art, in which a temperature dependence of the spring force shall be compensated by a compensating medium.

The document EP 1 795 777 A2 describes a gas spring with a working cylinder in which a working piston is slidably guided. The annular space formed between the working cylinder and a compensating cylinder is filled with a compensating medium that expands when the temperature increases. The open end of the working cylinder opposite a piston outlet end is closed by a cup-shaped compensating piston. As the compensating medium expands, it displaces the compensating piston so that the volume of the working cylinder increases.

The publication DE 31 41 295 A1 relates to a gas spring which consists of a container, wherein a piston connected to a piston rod slides on the inner wall of the container. A space filled with expansion material is located between a container-fixed partition and a disc piston, this disc piston representing a movable partition for the space filled with expansion material. The gas spring further comprises a working chamber with a pressurized gas filling. When the temperature increases, the expansion material expands and causes the disc piston to move further away from the container-fixed partition, thereby increasing the volume of the working chamber.

Known gas pressure springs with temperature compensation are usually of a complicated structure, require a significantly larger installation space than gas pressure springs without temperature compensation or cannot compensate for the temperature dependency over the entire temperature range relevant to their application.

SUMMARY

An aspect relates to creating a cost-effective and simply constructed gas pressure spring and a cost-effective and reliable method for its production, the spring force of the gas pressure spring being independent of the temperature over the widest possible temperature range.

The gas pressure spring comprises a working piston which is displaceably guided in a working cylinder along a stroke axis over a stroke range. The working piston is displaceable relative to the working cylinder along the stroke axis. The working cylinder is shaped like a hollow cylinder and/or arranged coaxially to the stroke axis.

The gas pressure spring comprises a compensating cylinder that surrounds the working cylinder radially to the stroke axis. The compensating cylinder is shaped like a hollow cylinder and/or arranged coaxially to the stroke axis. The compensating cylinder is rigidly attached to the working cylinder. The compensating cylinder is in one piece, so that the gas pressure spring is particularly easy to manufacture.

The working cylinder has an open end along the stroke axis. "Open" means at least that a gas can freely escape from the working cylinder through the open end and enter the working cylinder through the open end. In an embodiment, the open end is completely open.

At a piston rod end of the working cylinder opposite the open end along the stroke axis, a piston rod of the gas pressure spring attached to the working piston is led out of the working cylinder through a sealing device. The sealing device closes the piston rod end to a gas. "Closed" means that no gas can escape from or enter the working cylinder at the piston rod end.

At the open end, the compensating cylinder forms a projection beyond the working cylinder with a closed end along the stroke axis.

At a piston rod end of the compensating cylinder, lying opposite the closed end along the stroke axis, the piston rod of the gas pressure spring is led out of the compensating cylinder through a sealing device. The sealing device closes the end of the piston rod to a gas.

The sealing device closes the piston rod end of the compensating cylinder and the piston rod end of the working cylinder. The sealing device also serves as a guide device for guiding the piston rod along the stroke axis. The working cylinder is attached to the compensating cylinder via the sealing device.

The sealing device can comprise a one-piece, fastening element, for example made of aluminium, which is attached to the compensating cylinder and to the working cylinder, for example fastened in a form-fitting and/or material-locking manner, in particular by forming the compensating cylinder and/or the working cylinder. The sealing device can include a number of sealing elements, for example sealing rings, which seal the fastening element of the sealing device to the working cylinder, to the compensating cylinder and/or to the piston rod.

The sealing device can include an outer part that closes the piston rod end of the compensating cylinder and an inner part that closes the piston rod end of the working cylinder. The advantage of this two-part structure is that the inner part can be constructed like a standard gas pressure spring without a compensating cylinder.

The outer part of the sealing device can comprise at least one external fastening element, for example a sleeve, which fastens the compensating cylinder to the working cylinder, for example in a form-fitting, non-positive and/or material-locking manner. The outer part of the sealing device can comprise at least one outer sealing element, for example a sealing ring, which seals the working cylinder to the compensating cylinder.

The inner part of the sealing device can comprise at least one guide element, for example a guide bushing, which guides the piston rod along the stroke axis. The inner part of the sealing device can have at least one inner sealing element, for example a sealing ring, which seals the working cylinder to the piston rod.

A disc, in particular a metal disc with a corrosion-protected surface, can be arranged between the piston rod end of the working cylinder and the piston rod end of the compensating cylinder. The disc can increase the strength of the sealing device, in particular so that the sealing device is not damaged when the compensating cylinder is roller closed. The disc can, for example, be connected to the external fastening element of the sealing device via a latching connection.

The compensating piston separates, in a gas-tight manner, a working chamber arranged in the working cylinder, a compensating chamber arranged between the working cylinder and the compensating cylinder, and a restoring chamber arranged in the projection from one another.

A compensating medium is arranged in the compensating chamber, wherein the compensating medium moves the compensating piston towards the closed end when the compensating medium is heated. A pressure of the compensating medium is, for example, from 70 bar to 350 bar.

The compensating medium comprises an expansion material, in particular an expansion wax, particularly a mixture of an expansion wax and an oil. The compensating medium can in particular consist of the expansion material, the expansion wax or the mixture of the expansion wax and the oil. The compensating medium can, for example, be designed like the compensating medium described in the publication EP 1 795 777 A2. The expansion wax can, for example, be designed like the expansion wax described in the application DE 10 2020 113 749.

A restoring means is arranged in the restoring chamber, wherein the restoring means moves the compensating piston away from the closed end when the compensating medium cools down.

The restoring means comprises or is a restoring gas, the restoring gas being the same gas that fills the working chamber as a working gas. The restoring gas and/or the working gas is, for example, nitrogen. The restoring means can comprise or be formed by a mechanical restoring element, for example a spring, in particular a helical compression spring.

A gas pressure of the working gas is, for example, from 20 bar to 250 bar. A gas pressure of the restoring gas is, for example, from 20 bar to 350 bar.

A distance of the compensating cylinder from the working cylinder, measured radially to the stroke axis, is greater in the stroke range than in an end region of the working cylinder lying between the stroke range and the open end of the working cylinder.

The smaller distance in the end region causes a smaller cross-sectional area of the compensating chamber perpendicular to the stroke axis in the end region. As a result, at a given temperature increase, the compensating piston is moved further towards the closed end of the compensating cylinder by an expansion of the compensating medium, so that the working chamber is enlarged to a greater extent and greater compensation of the temperature dependence of the spring force of the gas pressure spring takes place.

Since the distance is not reduced in the stroke range, the compensating chamber can still accommodate enough compensating medium for effective temperature compensation.

Making the distance in the stroke range and in the end region different from each other has the disadvantage that it makes the production of the gas pressure spring more complex. In addition, in a transition region between the stroke range and the end region, material weakening can occur due to a deformation of the working cylinder and/or compensating cylinder, or leaks can occur due to connection points between parts of the working cylinder and/or compensating cylinder. The different distance could therefore jeopardize the reliable functioning of the gas pressure spring.

The distance is, for example, in the end region by 10% to 50%, by 20% to 40%, or by 30%, smaller than in the stroke range. The distance is, for example, in the end region 1 mm to 8 mm, 2 mm to 4 mm, or 2.5 mm. The distance is, for example, in the stroke range 2 mm to 12 mm, 3 mm to 6 mm, or 3 mm to 3.5 mm. With the stated values of the distance, extensive, in particular complete, compensation of the temperature dependence of the spring force of the gas pressure spring can be achieved over a typical operating temperature range of the gas pressure spring, for example from −10° C. to +60° C.

In an embodiment, the distance of the compensating cylinder from the working cylinder in the end region and/or in the stroke range is independent of a position along the stroke axis. In this embodiment, the distance in the end region and/or in the stroke range is constant along the stroke axis, which means that the gas pressure spring is particularly easy to produce.

DESCRIPTION OF EMBODIMENTS

An end region outer diameter of the working cylinder measured radially to the stroke axis is larger in the end region of the working cylinder than a stroke range outer diameter of the working cylinder in the stroke range measured radially to the stroke axis. Such an expansion of the working cylinder in the end region causes a reduced distance between the working cylinder and the compensating cylinder without changing the compensating cylinder or the shape of the working cylinder in the stroke range. The reduced distance is thus achieved with as few changes as possible compared to a gas pressure spring from the conventional art. The gas pressure spring can therefore be produced particularly easily and cost-effectively, in particular using known components and methods.

The end region outer diameter of the working cylinder is from 101% to 150%, from 105% to 130%, from 110% to 120%, or 112% to 113%, of the stroke range outer diameter of the working cylinder. The end region outer diameter is, for example, from 15 mm to 25 mm, from 16 mm to 22 mm, or from 18 mm to 21 mm. The stroke range outer diameter is, for example, from 10 mm to 20 mm, from 15 mm to 19 mm, or 17 mm to 18 mm. With the stated values of the outer diameter, extensive compensation of the temperature dependence of the spring force of the gas pressure spring can be achieved over a typical operating temperature range of the gas pressure spring.

In an embodiment, the outer diameter of the working cylinder in the end region and/or in the stroke range is independent of a position along the stroke axis. In this embodiment, the outer diameter is constant along the stroke axis in the end region and/or in the stroke range, which means that the gas pressure spring is particularly easy to produce.

A compensating cylinder inner diameter of the compensating cylinder measured radially to the stroke axis is from 110% to 200%, from 140% to 170%, from 150% to 160%, or 155% to 157%, of the stroke range outer diameter of the working cylinder. The compensating cylinder inner diameter is, for example, from 20 mm to 30 mm, from 23 mm to 27 mm, or 25 mm. With the stated values of the compensating cylinder inner diameter, extensive compensation of the temperature dependence of the spring force of the gas pressure spring can be achieved over a typical operating temperature range of the gas pressure spring.

In an embodiment, the inner diameter of the compensating cylinder is independent of a position along the stroke axis. In this embodiment, the inner diameter of the compensating cylinder is constant along the stroke axis, which makes the gas pressure spring particularly easy to manufacture.

The stroke range and the end region of the working cylinder are connected to one another in one piece, so that the gas pressure spring is particularly easy to produce. For example, the working cylinder can be widened transversely to the stroke axis in the end region relative to the stroke range.

The stroke range and the end region can, for example, be connected to one another in a materially bonded manner, in particular welded, soldered and/or glued to one another. The stroke range and the end region can, for example, be connected to one another in a form-fitting and/or force-fitting manner, in particular screwed, locked and/or clamped to one another.

The working cylinder can, for example, comprise or consist of a metal, in particular a steel, and/or a plastic.

A wall thickness of the working cylinder, measured radially to the stroke axis, is the same in the stroke range and in the end region of the working cylinder. The wall thickness is considered to be the same in particular if it is the same except for a reduction in the wall thickness caused by an expansion of the working cylinder in the end region, for example up to a reduction of up to 0.2 mm. The wall thickness is independent of a position along the stroke axis. In this embodiment, the wall thickness of the working cylinder is constant along the stroke axis, which makes the gas pressure spring particularly easy to manufacture.

A wall thickness of the compensating cylinder radially to the stroke axis is independent of a position along the stroke axis. In this embodiment, the wall thickness of the compensating cylinder is constant along the stroke axis, which makes the gas pressure spring particularly easy to manufacture.

The compensating piston is in one piece, so that the gas pressure spring is particularly easy to produce.

The compensating piston comprises aluminium or a plastic. The compensating piston is made of aluminium or a plastic.

The compensating piston is hollow cylindrical and in particular arranged coaxially to the stroke axis.

The compensating piston has a cylinder base on an underside of the compensating piston. The cylinder base is aligned perpendicular to the stroke axis and/or closed.

The compensating piston comprises a cylinder jacket arranged around the stroke axis. The cylinder jacket is desirably closed.

The compensating piston is open at an upper side of the compensating piston opposite the cylinder base along the stroke axis. This results in the advantage that the interior of the compensating piston can serve as part of the working chamber or the restoring chamber, so that the gas pressure spring can have a particularly compact design.

The compensating piston is cup-shaped, with the cylinder base corresponding to a cup base and the cylinder jacket corresponding to a cup wall.

A hollow cylindrical or cup-shaped compensating piston has the advantage that it can separate the working chamber, the compensating chamber, and the restoring chamber from each other with a particularly low mass.

A compensating cylinder seal which seals the compensating piston to the compensating cylinder, in particular in a gas-tight manner, is arranged on the compensating piston. The compensating cylinder seal may be attached to the compensating piston. The compensating cylinder seal can comprise or be formed by a sealing ring, in particular an O-ring, which runs around the stroke axis, in particular coaxially.

The compensating piston comprises a cylinder brim, adjacent to the upper side, projecting radially outward from the stroke axis beyond the cylinder jacket, the compensating cylinder seal being arranged, in particular fastened, on the cylinder brim. With the help of cylinder brim, the compensating cylinder seal can be brought into reliable sealing contact with the compensating cylinder with little material expenditure.

The upper side of the compensating piston is open to the restoring chamber. As a result, the interior of the compensating piston becomes part of the restoring chamber, so that more volume is available for the restoring means relative to the working gas. With a working gas volume that is smaller relative to the restoring means volume, the temperature dependence of the spring force can be compensated for more easily.

On the compensating piston, on the cylinder jacket of the compensating piston, or on the working cylinder, a working cylinder seal which seals the compensating piston to the working cylinder, in particular in a gas-tight manner, is arranged, in particular fastened. The working cylinder seal can comprise or be formed by a sealing ring, in particular an O-ring, which runs around the stroke axis, in particular coaxially.

The compensating piston, desirably the cylinder jacket of the compensating piston and also the cylinder base of the compensating piston, is arranged at least in sections in the end region of the working cylinder. As a result, the volume of the compensating chamber and/or the restoring chamber is increased relative to the volume of the working chamber, whereby a more effective compensation of the temperature dependence of the spring force of the gas pressure spring is achieved.

The compensating piston is arranged completely in the compensating cylinder. This results in the advantage that a length of the gas pressure spring measured along the stroke axis does not change when the compensating piston moves. The length of the gas pressure spring is therefore not dependent on temperature.

The gas pressure spring comprises a number of, for example one, two, three, four, five or more, support elements, the number of support elements supporting the working cylinder on the compensating cylinder. The support elements prevent relative movements of the working cylinder relative to the compensating cylinder, which could impair sealing of the compensating piston to the working cylinder or to the compensating cylinder or a displaceability of the compensating piston along the stroke axis.

The support elements are arranged spaced apart from one another around the stroke axis, and/or the support elements have openings along the stroke axis. As a result, the support elements essentially do not hinder expansion or compression of a compensating medium along the stroke axis in the compensating chamber between the working cylinder and the compensating cylinder.

The support elements are evenly distributed around the stroke axis. As a result, the support elements can support the working cylinder particularly reliably on the compensating cylinder.

The support elements are arranged at the end region of the working cylinder. Since the end region adjoins the compensating piston, the support elements can particularly effectively ensure the sealing and displaceability of the compensating piston at the end region.

The support elements can be designed as a ring that is perforated along the stroke axis, which is arranged coaxially to the stroke axis and mechanically connects the working cylinder to the compensating cylinder. The ring is arranged at the stroke range of the working cylinder. In the stroke range, the ring impedes particularly little expansion or compression of a compensating medium in the compensating chamber along the stroke axis.

The number of support elements is in one piece with the working cylinder or with the compensating cylinder. This reduces the number of components of the gas pressure spring, so that the gas pressure spring can be produced particularly easily, quickly, and cost-effectively.

The support elements can be formed, for example, by reshaping the working cylinder and/or the compensating cylinder. This allows the support elements to be formed particularly quickly and easily. The deformations include, for example, widenings of the working cylinder on the compensating cylinder and/or, in particular point-shaped, depressions of the compensating cylinder on the working cylinder. Due to the small distance between the working cylinder and the compensating cylinder in the end region, the support elements can be formed particularly easily in the end region by the deformations.

In embodiments, the method for producing the gas pressure spring includes providing a working cylinder blank, wherein the working cylinder blank is shaped hollow cylindrically and has an outer diameter transverse to the longitudinal axis that is independent of a position along its longitudinal axis. The outer diameter is therefore constant along the stroke axis. The working cylinder blank can in particular be a working cylinder of a known gas pressure spring. The Working cylinder blank has material properties that depend on an azimuth with respect to its longitudinal axis, for example due to a weld seam along the longitudinal axis. Such a working cylinder blank can be produced particularly easily and inexpensively, for example by being drawn from steel and welded.

In embodiments, the method includes forming the working cylinder blank into the working cylinder of the gas pressure spring, the forming comprising expanding the outer diameter of the working cylinder blank in an end region of the working cylinder blank.

In embodiments, the method includes arranging the compensating piston of the gas pressure spring at least in sections in the end region of the working cylinder of the gas pressure spring.

The expansion includes inserting a mandrel into the end region and arranging a sleeve running around the longitudinal axis around the end region of the working cylinder blank before inserting the mandrel, so that the end region rests on the sleeve after expansion. This allows the diameter of a working cylinder blank, the material properties of which depend on an azimuth with respect to its longitudinal axis, to be expanded to a diameter that is independent of the azimuth.

In embodiments, the method includes reshaping the working cylinder of the gas pressure spring and/or the compensating cylinder of the gas pressure spring to produce a number of support elements, the number of support elements supporting the working cylinder on the compensating cylinder. The support elements can be designed as described above, which results in the advantages mentioned there.

The forming to produce the support elements includes, for example, widening the working cylinder to the compensating cylinder and/or deepening the compensating cylinder to the working cylinder, in particular in a punctiform manner.

In an embodiment, the expansion of the working cylinder to produce the support elements takes place in the same step as the expansion of the end region of the working cylinder blank to form the working cylinder. For this purpose, for example, a mandrel can be inserted into the end region of the working cylinder blank, the mandrel having a number of projections to produce the support elements during the expansion of the end region of the working cylinder blank to form the working cylinder.

In embodiments, the method includes forming or machining a compensating piston blank into the compensating piston. Forming allows the compensating piston to be manufactured with particularly little material requirement. The compensating piston can be produced, for example, by deep drawing a compensating piston blank made of aluminium. The compensating piston can be produced, for example, by forming from a compensating piston blank made of steel.

The compensating piston blank can, for example, have a hollow cylindrical shape. The hollow cylindrical compensating piston blank can be expanded at one end along its longitudinal axis, for example from an inner diameter of 18 mm to an inner diameter of 23 mm, to form an outwardly projecting cylinder brim. The hollow cylindrical compensating piston blank can be closed at its other end by roller closing and/or plasma welding to form a closed cylinder base. Corrugations running around its longitudinal axis can be rolled into the cylinder jacket of the compensating cylinder blank to partially accommodate the compensating cylinder seal and/or the working cylinder seal.

The working cylinder of the gas pressure spring has a groove on an inside of a jacket wall of the working cylinder, through which a gas contained in the working cylinder can flow past the working piston of the gas pressure spring along the stroke axis of the gas pressure spring.

A cross-sectional area of the groove that is oriented orthogonally to the stroke axis varies along the stroke axis. In an embodiment, the cross-sectional area is minimal at the ends of the stroke range of the working cylinder and maximum in a central section between the ends of the stroke range. This causes a higher flow resistance to the gas at the ends of the stroke range. Consequently, the gas pressure spring causes a higher damping force near a maximum insertion of the piston rod into the gas pressure spring and near a maximum extension of the piston rod from the gas pressure spring than in intermediate positions of the piston rod. The increased damping force near the maximum insertion and maximum extension causes movement of the piston rod to be braked more strongly there, so that a damage to the gas pressure spring by reaching the maximum insertion or extension at high speed is avoided.

The cross-sectional area of the groove varies by a variable depth of the groove perpendicular to the inside of the jacket wall of the working cylinder.

In a particularly advantageous embodiment, particularly for the use of the gas pressure spring in a drive system described below, the cross-sectional area of the groove increases along the stroke axis from an extension end of the stroke range of the working cylinder facing the piston rod end of the working cylinder towards the open end of the working cylinder in an extension transition region, linear: is constant in a central region adjoining the extension transition region: decreases, linearly, in an insertion transition region adjoining the central region; and is constant in an insertion end region adjoining the insertion transition region up to an insertion end of the stroke range facing the open end of the working cylinder.

Due to the aforementioned course of the cross-sectional area, a high damping force is achieved when the piston rod is inserted into the gas pressure spring and approaches the maximum insertion. This can in particular prevent a flap supported by the gas pressure spring from closing completely too quickly, which could otherwise lead to damage to the flap or injuries to an operator of the flap.

The working piston of the gas pressure spring comprises a seal, in particular a sealing ring, which seals the piston to an inside of a jacket wall of the working cylinder. The seal is so stiff that it does not penetrate into a groove arranged on the inside of the jacket wall. This prevents the seal from closing the groove, which would block the gas spring.

Embodiments of the invention relate to a drive system for a flap with a. a gas pressure spring according to embodiments of the invention to support the flap and b. an electromechanical drive, for example a linear drive, in particular a spindle drive, for driving the flap.

The flap can be, for example, a flap of a vehicle, in particular a bonnet, a trunk lid, a luggage compartment lid or a wing door.

Drive systems for a flap with a gas pressure spring to support the flap and an electromechanical drive to drive the flap are known in the conventional art. Except for the use of a gas pressure spring according to embodiments of the invention instead of a generic gas spring, the drive system according to embodiments of the invention can be constructed like a corresponding drive system from the conventional art, for example from DE 103 13 440 A1 or DE 10 2008 045 903 A1.

The gas spring of the drive system is used to hold the flap in any position against gravity, while the electromechanical drive is used to open and close the flap. In addition, manual actuation of the flap can be provided as in DE 103 13 440 A1 and DE 10 2008 045 903 A1.

The gas pressure spring must have such a high spring force that it can hold the flap even at low ambient temperatures. Since the spring force in conventional gas pressure springs increases with increasing temperature, this means that at high temperatures the electromechanical drive or an operator must apply a very high force in order to close the flap. Therefore, the drive system must include a very powerful electromechanical drive, which is expensive, takes up a lot of space and consumes a lot of energy during operation. In addition, there is a high level of wear on the electromechanical drive and other parts mechanically connected to the flap, such as hinges.

In the conventional art, these problems are circumvented by using a spring strut instead of the gas pressure spring (e.g. DE 10 2008 045 903 A1, para. [0021]). Although a spring strut has a spring force that is almost independent of temperature, it is larger, heavier, and more expensive than a gas strut with a comparable spring force.

Relative to a spring strut designed to support a given load, a gas pressure spring designed to support the same load has a higher damping force due to its high gas pressure. This applies in particular to high insertion speeds because of the fluid dynamic flow resistance of the gas in the gas pressure spring that increases with increasing insertion speed of the piston rod into the gas pressure spring. As a result, a gas pressure spring only slightly slows down slow movements of the flap that occur when the flap is operated as intended by the drive. Rapid movements of the flap, which can occur, for example, if the flap is operated incorrectly or the drive malfunctions, the gas pressure spring slows down significantly.

This means that the drive system is particularly light, cost-effective, space-saving and safe thanks to the use of a gas pressure spring instead of a spring strut. By using a temperature-compensated gas pressure spring according to embodiments of the invention instead of a standard gas pressure spring, the aforementioned disadvantages of standard gas pressure springs are overcome.

BRIEF DESCRIPTION

Some of the embodiments will be described in detail, with references to the following Figures, wherein like designations denote like members, wherein.

DETAILED DESCRIPTION

Figure 1:
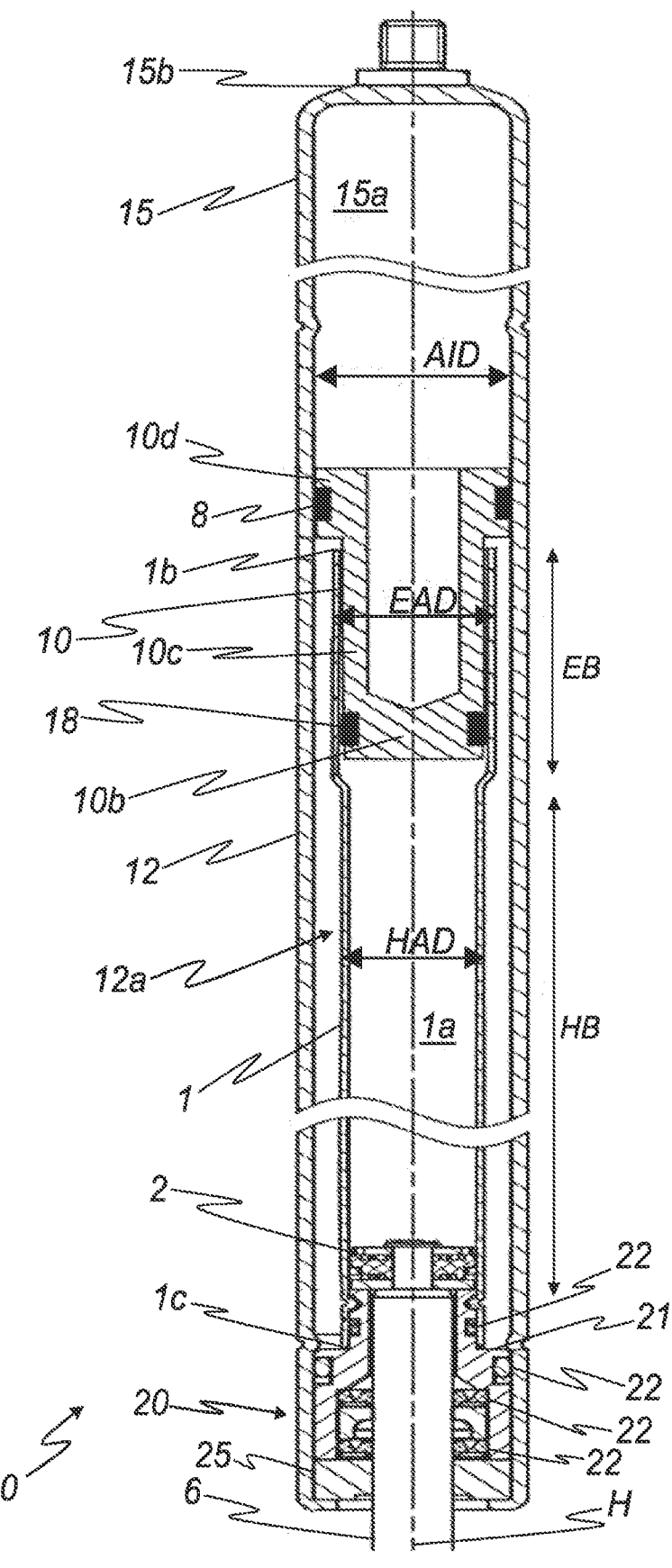
FIG. 1 shows an example of a schematic longitudinal section along the stroke axis of an embodiment of the gas pressure spring.

FIG. 1 shows a schematic longitudinal section along the stroke axis H of an embodiment of the gas pressure spring 50 according to embodiments of the invention.

The gas pressure spring 50 shown comprises a working piston 2 which is displaceably guided in a working cylinder 1 along a stroke axis H over a stroke range HB, a compensating cylinder 12 surrounding the working cylinder I radially to the stroke axis H, and a hollow cylindrically shaped compensating piston 10 displaceably guided in the compensating cylinder 12 along the stroke axis H relative to the working cylinder 1 and to the compensating cylinder 12.

The working cylinder I has an open end 1b along the stroke axis H, with the compensating cylinder 12 forming a projection 15 over the working cylinder 1 at the open end 1b, the projection having a closed end 15b along the stroke axis H.

The compensating piston 10 separates a working chamber 1a arranged in the working cylinder 1, a compensating chamber 12a arranged between the working cylinder 1 and the compensating cylinder 12, and a restoring chamber 15a arranged in the projection 15 from one another.

The compensating piston 10 comprises a cylinder base 10b at an underside of the compensating piston 10 facing the working chamber 1a and a cylinder jacket 10c arranged around the stroke axis H. The cylinder base 10b and part of the cylinder jacket 10c are arranged in the working cylinder 1. The compensating piston 10 is open on an upper side 10a of the compensating piston 10 facing the restoring chamber 15a.

A compensating cylinder seal 8 sealing the compensating piston 10 to the compensating cylinder 12 is arranged on the compensating piston 10.

The compensating piston 10 comprises a cylinder brim 10d which projects radially to the stroke axis H outwards over the cylinder jacket 10c, with the compensating cylinder seal 8 being arranged on the cylinder brim 10d.

A working cylinder seal 18 sealing the compensating piston 10 to the working cylinder 1 is arranged on the cylinder jacket 10c of the compensating piston 10.

At a piston rod end 1c of the working cylinder 1 opposite the open end 1b along the stroke axis H, a piston rod 6 attached to the working piston 2 is led out of the working cylinder 1 through a sealing device 20.

The sealing device 20 comprises a fastening element 21, for example made in one piece from aluminium, which is fastened to the compensating cylinder 12 and to the working cylinder 1, for example in a form-fitting manner. The sealing device 20 comprises a number of sealing elements 22, for example four sealing rings, which seal the fastening element 21 of the sealing device 20 to the working cylinder 1, to the compensating cylinder 12, and to the piston rod 6.

A distance of the compensating cylinder 12 from the working cylinder 1, measured radially to the stroke axis H, is greater in the stroke range HB than in an end region EB of the working cylinder 1 lying between the stroke range HB and the open end 1b of the working cylinder 1.

The distance reduced in the end region EB comes about because an end region outer diameter EAD of the working cylinder 1, measured radially to the stroke axis H, is larger than a stroke range outer diameter HAD of the working cylinder 1, measured radially to the stroke axis H, in the stroke range HB. The end region outer diameter EAD is, for example, 18 mm to 20 mm. The stroke range outer diameter HAD is, for example, 16 mm.

A compensating cylinder inner diameter AID of the compensating cylinder 12 is, for example, 25 mm.

Figure 2:
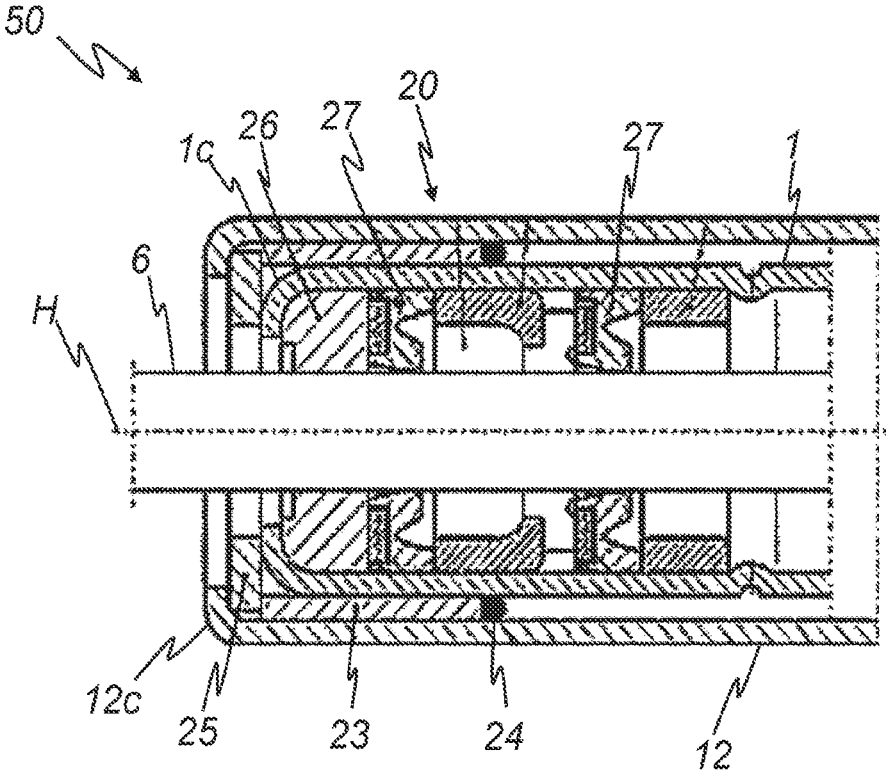
FIG. 2 shows a schematic longitudinal section of an alternative embodiment of the sealing device of a gas pressure spring.

FIG. 2 shows a schematic longitudinal section along the stroke axis H of an alternative embodiment of the sealing device 20 of a gas pressure spring 5 according to embodiments of the invention.

The sealing device 20 shown in FIG. 2 comprises an outer part which closes the piston rod end 12c of the compensating cylinder 12, and an inner part which closes the piston rod end 1c of the working cylinder 1.

The outer part of the sealing device 20 comprises an external fastening element 23, for example a sleeve, which fastens the compensating cylinder 12 to the working cylinder 1, for example in a materially bonded manner, in particular by an adhesive. The outer part of the sealing device comprises an outer sealing element 24, for example a sealing ring, which seals the working cylinder 1 to the compensating cylinder 12.

The inner part of the sealing device 20 comprises a guide element 26, for example a guide bushing, which guides the piston rod 6 of the gas pressure spring 5 along the stroke axis H. The inner part of the sealing device 20 comprises at least one inner sealing element 27, for example a sealing ring or two sealing rings, which seals the working cylinder 1 to the piston rod 6.

For example, a disc 25, in particular a metal disc with a corrosion-protected surface, is arranged between the piston rod end 1c of the working cylinder 1 and the piston rod end 12c of the compensating cylinder 12.

Figure 3:
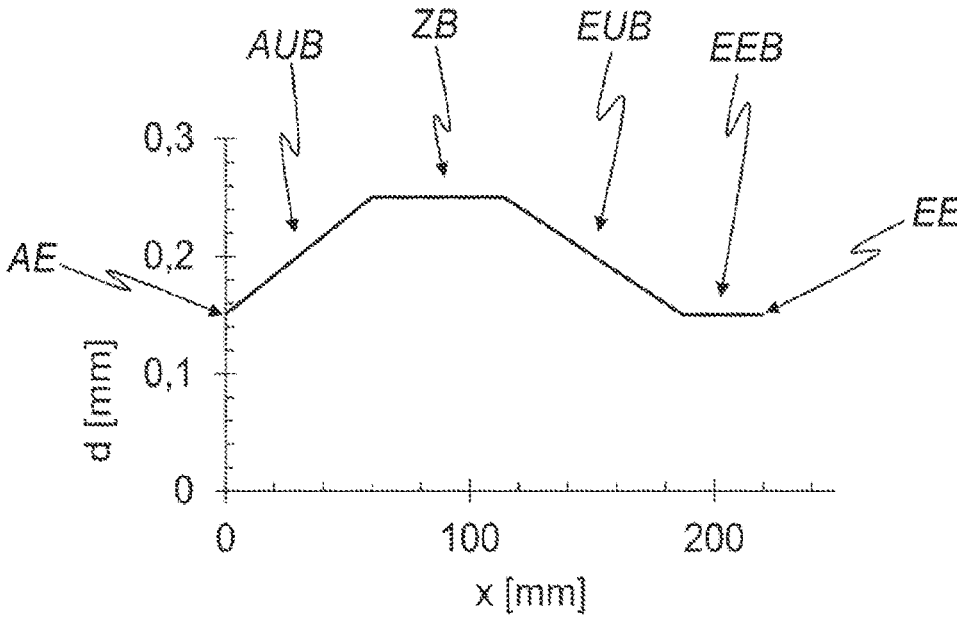
FIG. 3 shows schematically a course of a depth of a groove on an inside of a jacket wall of the working cylinder of a gas pressure spring according to embodiments of the invention.

FIG. 3 shows schematically a course of a depth d of a groove on an inside of a jacket wall of the working cylinder of a gas pressure spring according to embodiments of the invention depending on a position x along the stroke axis of the gas pressure spring.

In the example shown, the depth of the groove increases linearly along the stroke axis from an extension end AE of the stroke range of the working cylinder facing the piston rod end of the working cylinder towards the open end of the working cylinder in an extension transition region AUB; is constant in a central region ZB adjoining the extension transition region AUB; decreases linearly in an insertion transition region EUB adjoining the central region ZB; and is constant in an insertion end region EEB adjoining the insertion transition region EUB up to an insertion end EE of the stroke range facing the open end of the working cylinder.

Although the invention has been illustrated and described in greater detail with reference to the exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

| Reference Signs List | |
| --- | --- |
| 1 | working cylinder |
| 1a | inner working chamber |
| 1b | open end |
| 1c | piston rod end |
| 2 | working piston |
| 6 | piston rod |
| 8 | compensating cylinder seal |
| 10 | compensating piston |
| 10b | cylinder base |
| 10c | cylinder jacket |
| 10d | cylinder brim |
| 12 | compensating cylinder |
| 12a | compensating room |
| 12c | piston rod end |
| 15 | projection |
| 15a | restoring chamber |
| 15b | closed end |
| 18 | working cylinder seal |
| 20 | sealing device |
| 21 | fastening element |
| 22 | sealing element |
| 23 | external fastening element |
| 24 | outer sealing element |
| 25 | disc |
| 26 | guide element |
| 27 | inner sealing element |
| 50 | gas pressure spring |
| AE | extension end |
| AID | compensating cylinder inner diameter |
| AUB | extension transition region |
| d | depth |
| EAD | end region outer diameter |
| EB | end region |
| EE | insertion end |
| EEB | insertion end region |
| EUB | insertion transition region |
| H | stroke axis |
| HAD | stroke range outer diameter |
| HB | stroke range |
| x | position along the stroke axis |
| ZB | central region |

The invention claimed is:

1. A gas pressure spring, comprising:

a. a working piston which is displaceably guided in a working cylinder along a stroke axis over a stroke range;

b. a compensating cylinder surrounding the working cylinder radially to the stroke axis; and c. a compensating piston which is displaceably guided in the compensating cylinder along the stroke axis;

d. wherein the working cylinder has an open end along the stroke axis;

e. wherein the compensating cylinder forms a projection along the stroke axis beyond the working cylinder at the open end, the projection having a closed end;

f. wherein the compensating piston separates a working chamber arranged in the working cylinder, a compensating chamber arranged between the working cylinder and the compensating cylinder and a restoring chamber arranged in the projection from one another;

g. wherein a distance of the compensating cylinder from the working cylinder measured radially to the stroke axis is greater in the stroke range than in an end region of the working cylinder lying between the stroke range and the open end of the working cylinder;

wherein h. the compensating piston is arranged at least in sections in the end region of the working cylinder.

2. The gas pressure spring according to claim 1, wherein a wall thickness of the working cylinder measured radially to the stroke axis is the same in the stroke range and in the end range of the working cylinder.

3. The gas pressure spring according to claim 1, wherein the compensating piston is in one piece.

4. The gas pressure spring according to claim 1, wherein the compensating piston comprises aluminium or a plastic.

5. The gas pressure spring according to claim 1, wherein the compensating piston is hollow cylindrical in shape, wherein the compensating piston a. comprises a closed cylinder base Aby at an underside of the compensating piston;

b. comprises a cylinder jacket arranged around the stroke axis; and c. is open on an upper side of the compensating piston being arranged opposite the cylinder base along the stroke axis;

d. wherein a compensating cylinder seal sealing the compensating piston to the compensating cylinder is arranged on the compensating piston.

6. The gas pressure spring according to claim 5, wherein a. the compensating piston comprises a cylinder brim projecting radially to the stroke axis outwards over the cylinder jacket, b. wherein the compensating cylinder seal is arranged on the cylinder brim.

7. The gas pressure spring according to claim 5, wherein the upper side of the compensating piston is open to the restoring chamber.

8. The gas pressure spring according to claim 1, wherein a working cylinder seal sealing the compensating piston to the working cylinder is arranged on the compensating piston.

9. The gas pressure spring according to claim 1, wherein the gas pressure spring comprises a number of support elements, the number of support elements supporting the working cylinder on the compensating cylinder.

10. The gas pressure spring according to claim 9, wherein the number of support elements is integral with the working cylinder or with the compensating cylinder.

11. The gas pressure spring according to claim 1, wherein the compensating piston is arranged completely in the compensating cylinder.

12. A method for producing a gas pressure spring according to claim 1, characterized by the following:

a. providing a working cylinder blank, wherein the working cylinder blank is shaped like a hollow cylinder and has an outer diameter transverse to its longitudinal axis that is independent of a position along the longitudinal axis;

b. forming the working cylinder blank into the working cylinder of the gas pressure spring, the forming comprising an expansion of the outer diameter of the working cylinder blank in an end region of the working cylinder blank; and c. arranging the compensating piston of the gas pressure spring at least in sections in the end region of the working cylinder of the gas pressure spring.

13. The method according to claim 12, wherein the expansion includes inserting a mandrel into the end region and arranging a sleeve running around the longitudinal axis around the end region before inserting the mandrel, so that the end region lies against the sleeve after the expansion.

14. The method according to claim 12, characterized by the following:

forming the working cylinder of the gas pressure spring and/or the compensating cylinder of the gas pressure spring to produce a number of support elements, the number of support elements supporting the working cylinder on the compensating cylinder.

15. A drive system for a flap comprising:

a. a gas pressure spring according to claim 1 to support the flap; and b. an electromechanical drive.

16. The drive system for a flap of claim 15, wherein the electromechanical device is a spindle drive, to drive the flap.

* * * * *